(12) United States Patent
Dittmer et al.

(10) Patent No.: US 11,122,655 B2
(45) Date of Patent: Sep. 14, 2021

(54) CONVERTER-FED ELECTRIC ARC FURNACE WITH CAPACITOR ASSEMBLY IN THE SECONDARY CIRCUIT

(71) Applicant: Primetals Technologies Germany GmbH, Erlangen (DE)

(72) Inventors: Björn Dittmer, Nuremberg (DE); Martin Hergt, Nuremberg (DE); Detlef Rieger, Baldham (DE)

(73) Assignee: PRIMETALS TECHNOLOGIES GERMANY GMBH

( * ) Notice: Subject to any disclaimer, the term of this patent is extended or adjusted under 35 U.S.C. 154(b) by 356 days.

(21) Appl. No.: 16/333,323

(22) PCT Filed: Jul. 24, 2017

(86) PCT No.: PCT/EP2017/068571
§ 371 (c)(1),
(2) Date: Mar. 14, 2019

(87) PCT Pub. No.: WO2018/050332
PCT Pub. Date: Mar. 22, 2018

(65) Prior Publication Data
US 2019/0254128 A1    Aug. 15, 2019

(30) Foreign Application Priority Data

Sep. 15, 2016  (EP) .................................. 16188941

(51) Int. Cl.
*H05B 7/148* (2006.01)
*H05B 7/144* (2006.01)
(Continued)

(52) U.S. Cl.
CPC ............... *H05B 7/18* (2013.01); *H05B 7/005* (2013.01); *H05B 7/144* (2013.01); *Y02P 10/25* (2015.11)

(58) Field of Classification Search
CPC ........ H05B 7/005; H05B 7/144; H05B 7/148; H05B 7/156; H05B 7/18; Y02P 10/25;
(Continued)

(56) References Cited

U.S. PATENT DOCUMENTS 3,408,447 A    10/1968  Beck
4,677,643 A *   6/1987  Dicks ..................... H05B 7/156
                                                            373/105
(Continued)

FOREIGN PATENT DOCUMENTS

CN          1481198 A      3/2004
CN        101330217 A     12/2008
(Continued)

OTHER PUBLICATIONS

Office Action dated Jan. 6, 2021 issued in corresponding Chinese Patent Application No. 201780056909.0 (without English translation).

(Continued)

*Primary Examiner* — Hung D Nguyen
(74) *Attorney, Agent, or Firm* — Ostrolenk Faber LLP

(57) ABSTRACT

An electric arc furnace (1) operated with alternating current has a converter (2) which converts mains voltage (U), into primary voltage (U') having a furnace frequency (f'). A furnace transformer (4) transforms the primary voltage (U') into a secondary voltage (U"), supplied to electrodes (6) in a furnace vessel (8) (1). They apply electric arcs (10) to a melt material (9) in the vessel (8). The secondary voltage (U") is also supplied to a capacitor assembly (7) on the output side of the furnace transformer (4) and the furnace transformer (4) is connected on the output side. A control device (5) controls the converter (2) such that a primary voltage (U') output from the converter (2) to the furnace
(Continued)

transformer (4) has a furnace frequency (f) of least ten times the mains frequency (f) and/or greater than 1 kHz.

10 Claims, 3 Drawing Sheets

(51) Int. Cl.
*H05B 7/18* (2006.01)
*H05B 7/00* (2006.01)

(58) Field of Classification Search
CPC ...... Y02P 10/256; Y02P 10/259; F27B 3/085; F27B 3/20; F27B 3/28
USPC .............................. 373/60, 70, 102, 104, 108
See application file for complete search history.

(56) References Cited

U.S. PATENT DOCUMENTS

| | | | | |
|---|---|---|---|---|
| 5,583,883 | A * | 12/1996 | Paulsson | H05B 7/148 373/102 |
| 5,809,054 | A * | 9/1998 | Oelscher | H02J 3/1892 373/104 |
| 6,687,284 | B1 | 2/2004 | Beauregard et al. | 373/102 |
| 7,995,639 | B2 * | 8/2011 | Keough | H05B 6/067 373/52 |
| 8,933,378 | B2 | 1/2015 | Hörger et al. | 373/12 |
| 9,949,322 | B2 | 4/2018 | Doebbeler et al. | 373/44 |
| 10,470,259 | B2 | 11/2019 | Doebbeler et al. | 373/102 |
| 2016/0153714 | A1 | 6/2016 | Dorndorf et al. | 373/85 |

FOREIGN PATENT DOCUMENTS

| | | |
|---|---|---|
| CN | 101394694 A | 3/2009 |
| CN | 201466732 U | 5/2010 |
| CN | 103688591 | 3/2014 |
| CN | 105518401 A | 4/2016 |
| DE | 867 267 C | 2/1953 |
| DE | 949 425 C | 9/1956 |
| DE | 30 25 466 A1 | 2/1982 |
| DE | 10 2008 049 610 A1 | 4/2010 |
| EP | 2 824 408 A1 | 1/2015 |
| EP | 2 947 766 A1 | 11/2015 |
| WO | WO 97/49157 A1 | 12/1997 |
| WO | WO 2015/096915 A1 | 7/2015 |

OTHER PUBLICATIONS

International Search Report dated Sep. 8, 2017 in corresponding PCT International Application No. PCT/EP2017/068571.
Written Opinion dated Sep. 8, 2017 in corresponding PCT International Application No. PCT/EP2017/068571.

* cited by examiner

CONVERTER-FED ELECTRIC ARC FURNACE WITH CAPACITOR ASSEMBLY IN THE SECONDARY CIRCUIT

CROSS-REFERENCE TO RELATED APPLICATIONS

The present application is a 35 U.S.C. §§ 371 national phase conversion of PCT/EP2017/068571, filed Jul. 24, 2017, which claims priority of European Patent Application No. 16188941.5, filed Sep. 15, 2016, the contents of which are incorporated by reference herein. The PCT International Application was published in the German language.

TECHNICAL BACKGROUND

The present invention involves an electrical arrangement for an electric arc furnace operated with alternating current,
wherein the electrical arrangement comprises a converter, a furnace transformer, a number of electrodes and a capacitor assembly,
wherein the electrodes are arranged in a furnace vessel of the electric arc furnace, such that the electrodes apply electric arcs to a melt material in the furnace vessel,
wherein the converter has an input side, which is connected to a supply grid having a network frequency and a network voltage and has an output side, which is connected to the furnace transformer,
wherein the input side of the furnace transformer is connected to the converter and the output side is connected to the electrodes of the electric arc furnace, and
wherein the converter is controlled by a control device, such that a primary voltage output from the converter to the furnace transformer has a furnace frequency.

The present invention further relates to an operating method for an electric arc furnace that is operated with alternating current, comprising:
controlling a converter by a control device, such that the converter converts a network voltage at a network frequency from a supply grid into a primary voltage at a furnace frequency;
feeding the primary voltage to a furnace transformer, and there transforming the primary voltage into a secondary voltage,
feeding the secondary voltage to a plurality of electrodes of the electric are furnace arranged in a furnace vessel of the electric arc furnace, such that the electrodes apply electric arcs to a melt material in the furnace vessel.

An electrical arrangement of this type and the associated operating method are known, for example, from DE 10 2008 049 610 A1, Applicant: SIEMENS AKTIENGESELLSCHAFT, Title: Stromversorgungsanlage für einen Drehstrom-Lichtbogenofen mit Zwischenkreisumrichter zwischen Netzanschluss und Ofentransformator, and from the corresponding Canadian Patent CA2738729C and U.S. Pat. No. 8,933,378 B2, incorporated herein by reference. In the known electrical arrangement, only the electrodes are arranged on the secondary side of the furnace transformer. Any reactive power compensators and/or capacitor assemblies are either arranged between the supply grid and the converter, or between the converter and the furnace transformer.

An electrical arrangement for an electric arc furnace is also known from WO 97/49157 A1, Applicant: ASEA BROWN BOVERI AB, Title: METHOD AND DEVICE FOR COMPENSATION OF REACTIVE POWER, incorporated herein by reference. In this arrangement, a capacitor assembly is present which, together with a controlled reactive power compensator and a plurality of series-connected arrangements of a capacitance and an inductance, is connected in parallel with the electric arc furnace. The above-mentioned parallel-connected components are connected via a transformer to a supply grid. The capacitance and the series-connected arrangements of one capacitance and one inductance respectively constitute filter circuits, which can be tuned to a whole-number or non-whole-number multiple of the network frequency. Nothing can be inferred from WO 97/49157 A1, Applicant: ASEA BROWN BOVERI AB, Title: METHOD AND DEVICE FOR COMPENSATION OF REACTIVE POWER, incorporated herein by reference, with respect to the internal design of the electric arc furnace. In particular, from WO 97/49157 A1, it cannot be inferred whether the transformer in WO 97/49157 A1 is the furnace transformer.

An electric arc furnace is known from DE 30 25 466 A1, Applicant: Ero-Starkstrom Kondensatoren GmbH, Title: Arc furnace assembly with feed transformer—uses specified work point on transformer secondary for inductive mode of light arc circuit incorporated herein by reference, comprising a plurality of electrodes, which are directly supplied from a three-phase AC voltage grid via a transformer. On the secondary side of the transformer, capacitors are arranged, which can be switched by means of switching elements.

A three-phase AC electric arc furnace is known from DE 949 425 C, Applicant: ALLGEMEINE ELEKTRICITAETS-GESELLSCHAFT, Title: Dreiphasiger Lichtbogenofen, incorporated herein by reference, wherein the electrodes of the electric arc furnace are supplied directly from a supply grid, via a transformer. Capacitors are arranged on the secondary side of the transformer.

An electric arc furnace is known from U.S. Pat. No. 6,687,284 B1, Beauregard et al, Assignee: Centre d'Innovation sur le Transport d'Energie du Québec, Title: METHOD AND APPARATUS TO FACILITATE RESTRIKING IN AN ARC-FURNACE, incorporated herein by reference herein, which is supplied from a three-phase AC voltage grid via a furnace transformer, at the network frequency. Additionally, a HF generator is provided, which superimposes a HF current upon the current output from the furnace transformer. A HF transformer can be arranged down-circuit of the HF generator. Capacitors inter alia are arranged between the furnace transformer and the electrodes which, in conjunction with the line capacitance of the conductors from the furnace transformer to the electrodes, are operated in resonance with respect to the HF frequency.

From DE 867 267 C, Applicant: Demag-Elektrometallurgie G.m.b.H, Title: Lichtbogen-oder Reduktionsofen, incorporated herein by reference, the superimposition of an initial current at a higher frequency, additionally to the electrode current, on an electrode arrangement of an electric arc furnace operated by a three-phase AC voltage is known. The initial current is fed via capacitors to the electrodes. The high-frequency current source for the generation of the initial current is supplied with energy via a transformer.

Electric arc furnaces, in particular three-phase AC electric arc furnaces, are employed for melting a solid source material (melt material). To this end, by means of a number of graphite electrodes, electrical energy in the form of arcs is introduced into the furnace vessel. The number of graphite electrodes corresponds to the supply voltage. In a conventional three-phase AC electric arc furnace, three electrodes are thus present and, in an electric furnace supplied with a DC voltage, only a single electrode is present. For the supply of the electrodes with electrical energy, by means of a furnace transformer, the medium- or high-voltage of the supply grid (generally between 10 and 40 kV, or in specific cases also up to 100 or 110 kV) at the network frequency (50 or 60 Hz) is stepped-down to a low voltage (generally several 100 V, or in some cases a little over 1 kV, but not exceeding 2 kV) and fed to the electrodes. The electrodes are mechanically moved upwards and downwards as required, in order to ignite the arc, and the arcing voltage, the current, and thus the coupled power, are adjusted by means of the clearance between the electrode and the source material or melt material.

The construction of current-carrying elements of the electric arc furnace is executed, inter alia, in consideration of self- and mutual inductances of the high-current system arising on the secondary side of the furnace transformer, through to the graphite electrodes. In general, it is endeavored to achieve a short-circuit reactance of these components, at the network frequency, in the region of approximately 3 milliohms. In this region, firstly, the maximum potential currents in the event of an operational short-circuit in the furnace vessel are limited. Secondly, the inductance energy stored in the electromagnetic field, in the event of the interruption of an arc, is made available in the form of a voltage increase. This is conducive to the re-ignition of the arc. Both of these effects are advantageous for the process control of the electric arc furnace. They are particularly conducive to the infeed of electrical energy.

As a result of the above-mentioned reactances, the power input of the electric arc furnace is characterized by a high reactive power component. Typical values for the power factor of the furnace branch are of the order of 0.8. In a transformer having an apparent capacity of 100 MVA and an active power input of 83 MW, the resulting reactive capacity is of the order of 56 MVAr. This results in higher electrical energy transmission losses. Moreover, it is necessary for electrical operating equipment to be rated to a correspondingly higher current-carrying capacity. Moreover, disadvantageously, system perturbations, in particular flicker, are frequently generated on the feeder supply grid. In addition, restrictions frequently apply with respect to the minimum permissible power factor on the electricity supply side, such that reactive power compensation is required for the purposes of compliance with the power factor.

The electric arc furnace is customarily operated with an inductance of sufficient magnitude in the power circuit. A sufficient current lag is achieved as a result. Consequently, at the current zero-crossing, a sufficient voltage is already present to maintain the flow of current. Conversely, however, this means that the electric arc furnace can only be operated up to a specific power factor. A high reactive capacity is produced as a result. Consequently, electrical operating equipment cannot be operated in an optimum manner.

The procedure according to DE 10 2008 049 610 A1, Applicant: SIEMENS AKTIENGESELLSCHAFT, Title: Stromversorgungsanlage für einen Drehstrom-Lichtbogenofen mit Zwischenkreisumrichter zwischen Netzanschluss und Ofentransformator, and from the corresponding Canadian Patent CA2738729C and U.S. Pat. No. 8,933,378 B2, incorporated herein by reference, already constitutes a progression in relation to the above-mentioned procedure. In particular, the electric arc furnace can be operated at a frequency which is selected independently of the network frequency of the supply grid. However, the procedure according to DE 10 2008 049 610 A1, Applicant: SIEMENS AKTIENGESELLSCHAFT, Title: Stromversorgungsanlage für einen Drehstrom-Lichtbogenofen mit Zwischenkreisumrichter zwischen Netzanschluss und Ofentransformator, and from the corresponding Canadian Patent CA2738729C and U.S. Pat. No. 8,933,378 B2, incorporated herein by reference, is still susceptible to further improvement.

SUMMARY OF THE INVENTION

The object of the present invention is the provision of options by means of which, firstly, the operation of the electric arc furnace can be optimized, in particular maximization of the stability of the arcs is possible. Secondly, costs associated with components required for the operation of the electric arc furnace are to be minimized.

According to the invention, an electrical assembly of the above-mentioned type is configured such that the output side of the furnace transformer is not only connected to the electrodes of the electric arc furnace, but is also connected to the capacitor assembly. Accordingly, contrary to the general and customary procedure according to the prior art, the capacitor assembly is not arranged on the primary side of the furnace transformer, or even further up-circuit in the supply grid, but is arranged on the secondary side of the furnace transformer. Moreover, actuation of the converter by the control device is executed such that the furnace frequency is equal to at least ten times the network frequency and/or is greater than 1 kHz.

This configuration firstly achieves that no controlled reactive power compensator is required, either between the supply grid and the converter, or between the converter and the furnace transformer, or on the output side of the furnace transformer. Consequently, no further reactive power compensation is required. It is instead possible for the supply from the converter to be adjusted such that the oscillating circuit constituted by the electrodes of the electric arc furnace on the one hand, and the capacitor assembly on the other, is excited to the resonant frequency.

The furnace frequency can in particular be selected to a value which is sufficiently high that it substantially exceeds the customary network frequency of 50 or 60 Hz. For this reason, the furnace transformer is preferably configured as a medium-frequency transformer.

The capacitor assembly can be configured as required. In particular, capacitors in the capacitor assembly can be connected in parallel and/or in series with the electrodes of the electric arc furnace.

This object is further fulfilled by an operating method having the characteristics disclosed herein. Advantageous configurations of the operating method are also disclosed herein.

According to the invention, the secondary voltage is not only fed to the electrodes, but is additionally fed to a capacitor assembly which is arranged on the output side of the furnace transformer. Additionally, the furnace frequency is at least ten times the network frequency and/or is greater than 1 kHz.

Analogously to the electrical arrangement, it is thus achieved that no controlled reactive power compensation is performed between the supply grid and the converter, nor between the converter and the furnace transformer, nor on the output side of the furnace transformer.

Preferably, the furnace frequency is not only substantially greater than the network frequency, but is even greater than 3 kHz. For example, the furnace frequency can lie between 5 and kHz. However, the furnace frequency can also assume even higher values, for example up to 20 kHz, up to 30 kHz, up to 50 kHz or, in rare cases, even higher values of up to 100 kHz. The furnace frequency is the fundamental frequency at which the electrodes are supplied. Consequently, the furnace frequency does not constitute a harmonic.

The furnace frequency can in particular be selected such that it lies within the resonance range of an electrical oscillating circuit which is constituted by the inductances of the electrodes of the electric arc furnace and the capacitor assembly.

Capacitors in the capacitor assembly, as mentioned above, can be connected in parallel and/or in series with the electrodes of the electric arc furnace, as required.

The above-mentioned properties, characteristics and advantages of the present invention, and the manner in which these are achieved, will be clarified and rendered more comprehensible in conjunction with the following description of exemplary embodiments, which are described in greater detail with reference to the drawings.

BRIEF DESCRIPTION OF THE DRAWINGS

In the drawings, in a schematic representation.

DESCRIPTION OF AN EMBODIMENT

Figure 1:
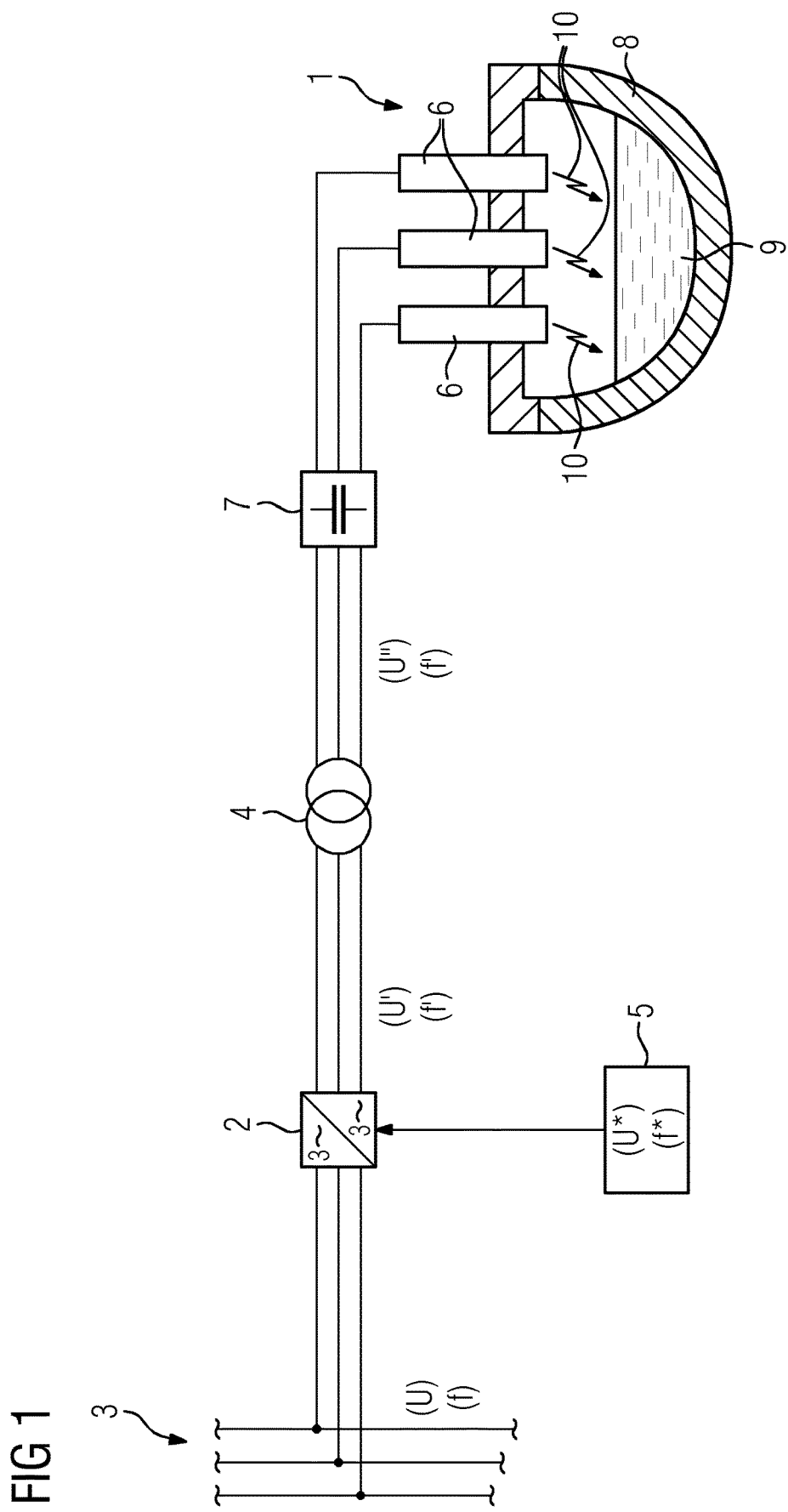
FIG. 1 shows an electrical arrangement and an electric arc furnace.

According to FIG. 1, an electrical arrangement for an electric arc furnace 1 comprises a converter 2. The converter 2 is connected on the input side to a supply grid 3, and on the output side to a furnace transformer 4. The converter 2 converts a network voltage U of the supply grid 3 into a primary voltage U'. The supply grid 3 is generally a three-phase AC voltage grid. The network voltage U is generally greater than 10 kV. For example, it can assume a value of 30 or 33 kV. The converter 2 can be configured, for example, as an intermediate circuit converter. A potential configuration of the converter 2 can in particular be executed in the manner described in DE 10 2008 049 610 A1, Applicant: SIEMENS AKTIENGESELLSCHAFT, Title: Stromversorgungsanlage für einen Drehstrom-Lichtbogenofen mit Zwischenkreisumrichter zwischen Netzanschluss und Ofentransformator, and from the corresponding Canadian Patent CA2738729C and U.S. Pat. No. 8,933,378 B2, incorporated herein by reference. However, other configurations of the converter 2 are possible.

The network voltage U has a network frequency f of customarily 50 or 60 Hz. The primary voltage U' is smaller than the network voltage U. In many cases, however, the primary voltage U' is only slightly lower than the network voltage U. For example, it can lie within the range of 70 to 100% of the network voltage U. However, the primary voltage U' assumes a furnace frequency f', which can be selected independently of the network frequency f. In particular, the furnace frequency f' can be substantially greater than the network frequency f, for example at least ten times the value thereof. The furnace frequency f' can be even greater than 1 kHz, in particular greater than 3 kHz. Preferred ranges for the furnace frequency f' lie between 5 and 15 kHz. However, even higher frequencies, of up to 100 kHz, are also possible. For the primary voltage U', a corresponding target value U* for the electric arc furnace 1 can be determined by a control device 5. The target value f* for the furnace frequency f' can be fixedly specified, can be stipulated to the control device 5 from the exterior, or determined by the control device 5. On the basis of the target values U*, f*, the control device 5 can execute a corresponding actuation of the converter 2. It is thus possible to employ the primary voltage U' as a control variable for the electric arc furnace 1.

On the grounds of the high furnace frequency f', the furnace transformer 4 is preferably configured as a medium-frequency transformer.

The primary voltage U' is fed to the input side of the furnace transformer 4. The furnace transformer 4 transforms the primary voltage U' into a secondary voltage U". The secondary voltage U" is lower than the primary voltage U'. The secondary voltage U" generally lies in the range of several hundred volts, or sometimes slightly more. In specific cases, values somewhat in excess of 1 kV, but not exceeding a maximum of 2 kV, are possible. Independently of the specific value of the secondary voltage U", however, the secondary voltage U" also assumes the furnace frequency f'.

On the output side, the furnace transformer 4 is connected to a number of electrodes 6 of the electric arc furnace 1 and a capacitor assembly 7. In the rare instance of a single-phase AC electric arc furnace, either two electrodes 6, or a single electrode 6 and a ground anode are provided. In the customary case of a three-phase AC electric arc furnace, the number is at least three, and in general is exactly three. Independently of the number of electrodes 6, however, the electric arc furnace 1 is operated by alternating current. The electrodes 6 are arranged in a furnace vessel 8 of the electric arc furnace 1. The electrodes 6 apply arcs 10 to a melt material 9 which is situated in the furnace vessel 8. The secondary voltage U" is fed to the electrodes 6 and to the capacitor assembly 7.

In any event, the supply of electricity to the electrodes 6 proceeds exclusively via the converter 2 and the furnace transformer 4. Accordingly, no other voltages or currents, potentially at different frequencies, are applied to the electrodes 6. Even if, in a specific case, any further additional application is delivered to the electrodes 6, this additional application will constitute only a small fraction (substantially below 10%, but in general even a maximum of 1%) of the electrical energy delivered to the electrodes 6. Accordingly, in this case, the "lion's share" of electrical energy will again be fed to the electrodes 6 via the converter 2 and the furnace transformer 4.

No further reactive power compensation is required, additionally to the capacitor assembly 7. Preferably, no controlled reactive power compensator is thus provided, either between the supply grid 3 and the converter 2, or between the converter 2 and the furnace transformer 4, or on the output side of the furnace transformer 4. This applies in particular to a TCR (thyristor controlled reactor). In many cases, additionally, no uncontrolled filter circuit is provided. However, if an uncontrolled filter circuit is provided, this is preferably arranged up-circuit of the converter 2, and is tuned to a harmonic of the network frequency f.

As a result of the inductances L of the electrodes 6 and the capacitance C of the capacitor assembly 7, the electrodes 6 of the electric arc furnace 1 and the capacitor assembly 7 constitute an oscillating electrical circuit. The oscillating electrical circuit has a resonance frequency fR, which is given by the following relationship:

$$fR = \frac{1}{2\pi\sqrt{LC}} \quad (1)$$

Figure 2:
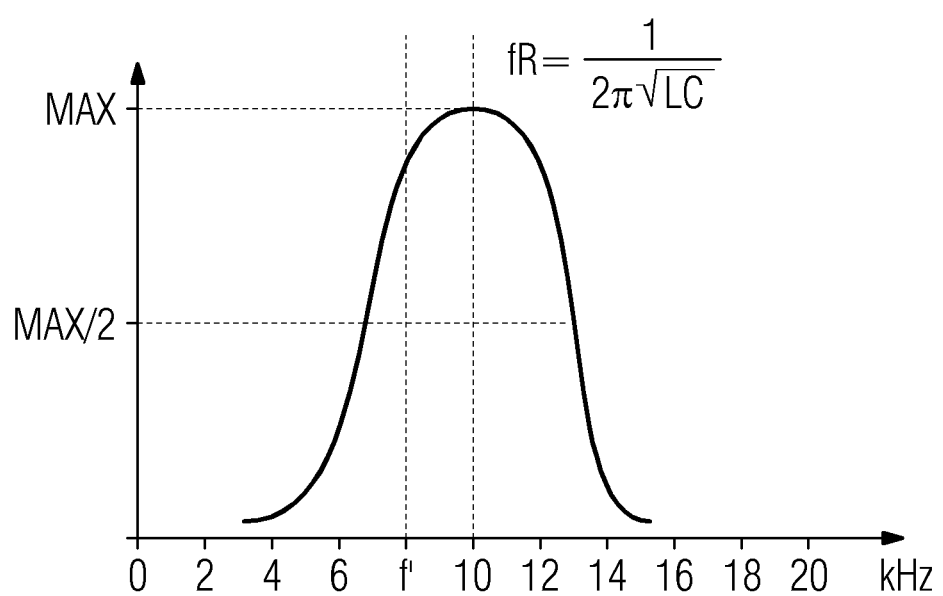
FIG. 2 shows a frequency diagram.

The furnace frequency f', as mentioned above, is substantially greater than the network frequency f. According to the representation shown in FIG. 2, the furnace frequency f' can lie within the resonance range of the oscillating electrical circuit. In particular, the following relationship can apply:

$$\alpha \leq f'/fR < \beta \quad (2)$$

$\alpha$ is a value of at least 0.3. In general, $\alpha$ lies within a range of 0.5 to 0.9. In particular, $\alpha$ can be of the order of 0.7. $\beta$ is a value not exceeding 3.3. In general, $\beta$ lies between 1.1 and 2.0. In particular, $\beta$ can be of the order of 1.4. Moreover, $\beta$ (at least to an accuracy of approximately 10%) can be the reciprocal of $\alpha$.

Figure 3:
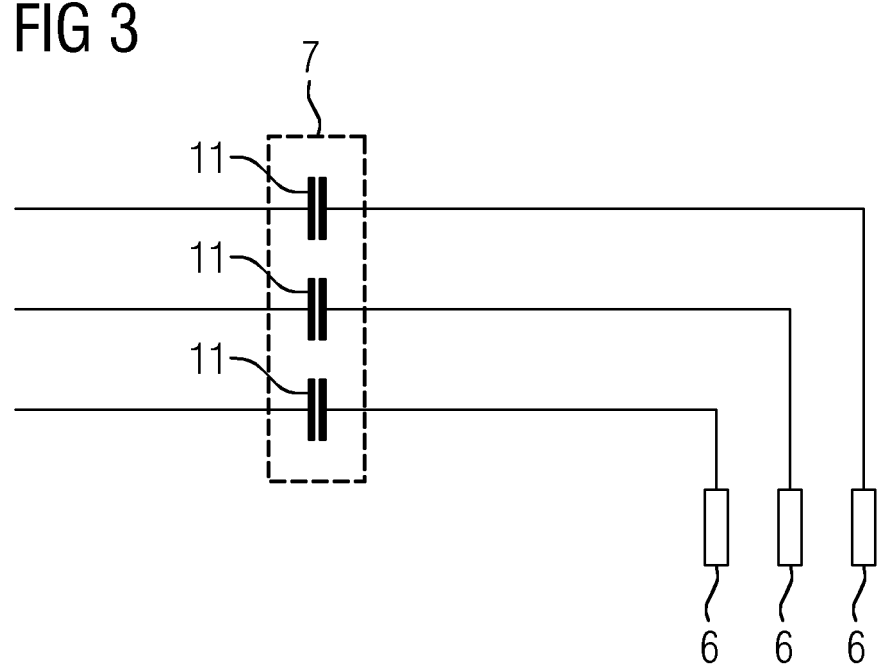
FIG. 3 shows a potential capacitor assembly.
Figure 4:
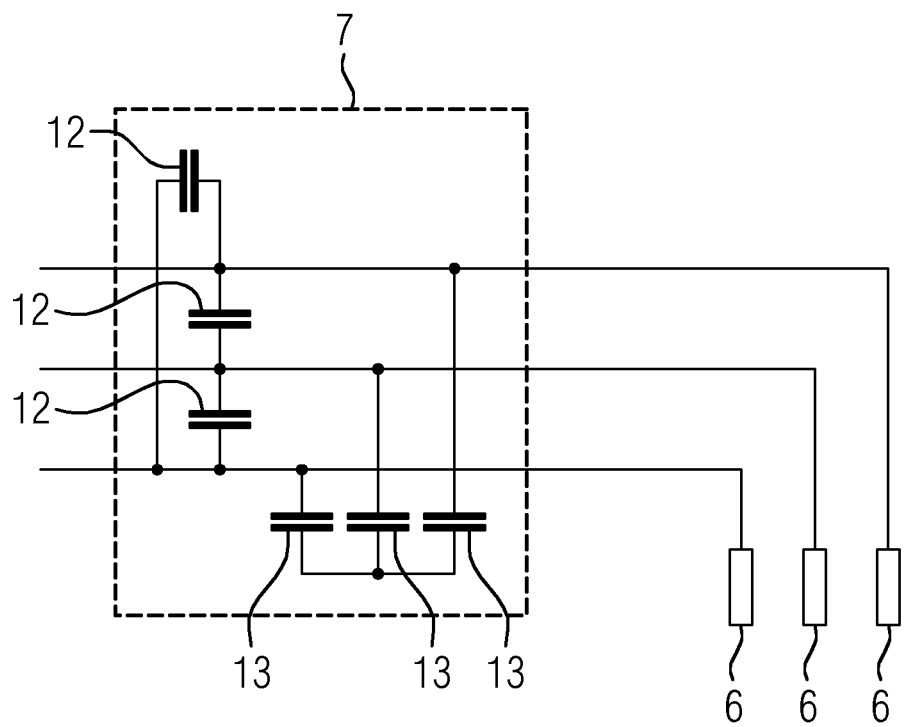
FIG. 4 shows a further potential capacitor assembly.

The specific configuration of the capacitor assembly 7 can be determined as required. For example, the capacitor assembly 7, as per the representation in FIG. 3, can comprise capacitors 11 which are arranged in the conductors to the electrodes 6 themselves, and are thus connected in series with the electrodes 6 of the electrode arc furnace 1. Alternatively, the capacitor assembly 7, according to the representation in FIG. 4, can comprise capacitors 12, 13, by means of which the conductors to the electrodes 6 are connected to one another and/or to a common neutral point. The neutral point can be grounded, but must not necessarily be so. In this case, the capacitors 12, 13 are connected in parallel with the electrodes 6 of the electric arc furnace 1. Combinations of arrangements of this type are also possible.

The present invention has numerous advantages. In particular, as a result of the high furnace frequency f', the stability of the arc can be ensured over an extended operating range. The probability of internal flashover associated with uncontrolled voltage surges is also minimized. Moreover, the electrical components employed, with respect to both their size and their nominal electrical ratings (for capacitance and inductance) can be of reduced dimensioning. The arrangement of the capacitor assembly 7 on the secondary side of the furnace transformer 4 permits the power factor to be set to values of 0.95 and higher, ideally to values of 0.98 and higher. The high furnace frequency f' additional permits the target value U* for the primary voltage U' to be tracked very rapidly—within the range of milliseconds—and permits the correction of the primary voltage U' within this time range. Accordingly, a tap changer is no longer required on the primary side of the furnace transformer 4. Moreover, the primary voltage U' can be varied. Flicker is reduced. The size of the furnace transformer can also be reduced. Energy consumption can be reduced. Maintenance costs are also reduced.

Although the invention has been illustrated and described in greater detail with reference to the preferred exemplary embodiment, the invention is not limited by the examples disclosed, and further variations can be inferred by a person skilled in the art, without departing from the scope of protection of the invention.

LIST OF REFERENCE SYMBOLS

1 Electric arc furnace
2 Converter
3 Supply grid
4 Furnace transformer
5 Control device
6 Electrodes
7 Capacitor assembly
8 Furnace vessel
9 Melt material
10 Arc
11-13 Capacitors
C Capacitance
f Network frequency
f' Furnace frequency
fR Resonance frequency
f* Target value for furnace frequency
L Inductance
U Network voltage
U' Primary voltage
U" Secondary voltage
U* Target value for primary voltage
$\alpha,\beta$ Values

The invention claimed is:

1. An electrical arrangement for an electric arc furnace operated with alternating current;
wherein the electrical arrangement comprises a converter, a furnace transformer, a number of electrodes and a capacitor assembly;
wherein the electrodes are arranged in a furnace vessel of the electric arc furnace, such that they apply electric arcs to a melt material in the furnace vessel;
wherein the converter has an input side connected to a supply grid having a network frequency (f) and a network voltage (U) and has an output side connected to the furnace transformer;
wherein the furnace transformer is configured to step down a primary voltage (U') which is fed to the furnace transformer from the converter into a secondary voltage (U") which is fed to the electrodes;
wherein the furnace transformer the input side is connected to the converter and the output side, is connected to the electrodes of the electric arc furnace and to the capacitor assembly;
wherein a control device controls the converter such that a primary voltage (U') output from the converter to the furnace transformer has a furnace frequency (f') which is equal to at least ten times the network frequency (f) and/or is greater than 1 kHz; and
wherein the furnace frequency (f') is the fundamental frequency at which the electrodes are supplied.

2. The electrical arrangement as claimed in claim 1, further comprising no controlled reactive power compensator is provided, either between the supply grid and the converter, or between the converter and the furnace transformer, or on the output side of the furnace transformer.

3. The electrical arrangement as claimed in claim 1, wherein the furnace transformer is configured as a medium-frequency transformer.

4. The electrical arrangement as claimed in claim 1, further comprising the capacitor assembly comprises capacitors, which are connected in parallel and/or in series with the electrodes of the electric arc furnace.

5. The electrical arrangement as claimed in claim 1, wherein the furnace frequency (f') lies within a resonance range of an electrical oscillating circuit which is constituted by the inductances (L) of the electrodes of the electric arc furnace and the capacitor assembly.

6. The operating method as claimed in claim 5, wherein the furnace frequency (f') lies within the resonance range of an electrical oscillating circuit which is constituted by the inductances (L) of the electrodes of the electric arc furnace and the capacitor assembly.

7. The operating method as claimed in claim 5, wherein the capacitor assembly comprises a plurality of capacitors, which are connected in parallel and/or in series with the electrodes of the electric arc furnace.

8. An operating method for an electric arc furnace operated with alternating current, comprising:

controlling a converter by a control device, such that the converter converts a network voltage (U) at a network frequency (f) from a supply grid into a primary voltage (U') at a furnace frequency (f');

wherein the furnace frequency (f') is equal to at least ten times the network frequency (f) and/or is greater than 1 kHz;

wherein the primary voltage (U') is fed to a furnace transformer, which steps down the primary voltage (U') into a secondary voltage (U") not exceeding 2 kV;

wherein the secondary voltage (U") is fed to a number of electrodes of the electric arc furnace arranged in a furnace vessel of the electric arc furnace, such that the electrodes apply electric arcs to a melt material in the furnace vessel;

wherein the secondary voltage (U") is moreover fed to a capacitor assembly arranged on the output side of the furnace transformer;

wherein the furnace frequency (f') is the fundamental frequency at which the electrodes are supplied.

9. The operating method as claimed in claim 8, further comprising no controlled reactive power compensation is executed between the supply grid and the converter, nor between the converter and the furnace transformer, nor on the output side of the furnace transformer.

10. The operating method as claimed in claim 8, wherein the furnace frequency (f') is greater than 3 kHz.

\* \* \* \* \*